(No Model.)
F. F. IDE.
SCALE FOR WEIGHING DIAMONDS, BALANCE SCREWS OF WATCHES, &c.
No. 272,699. Patented Feb. 20, 1883.
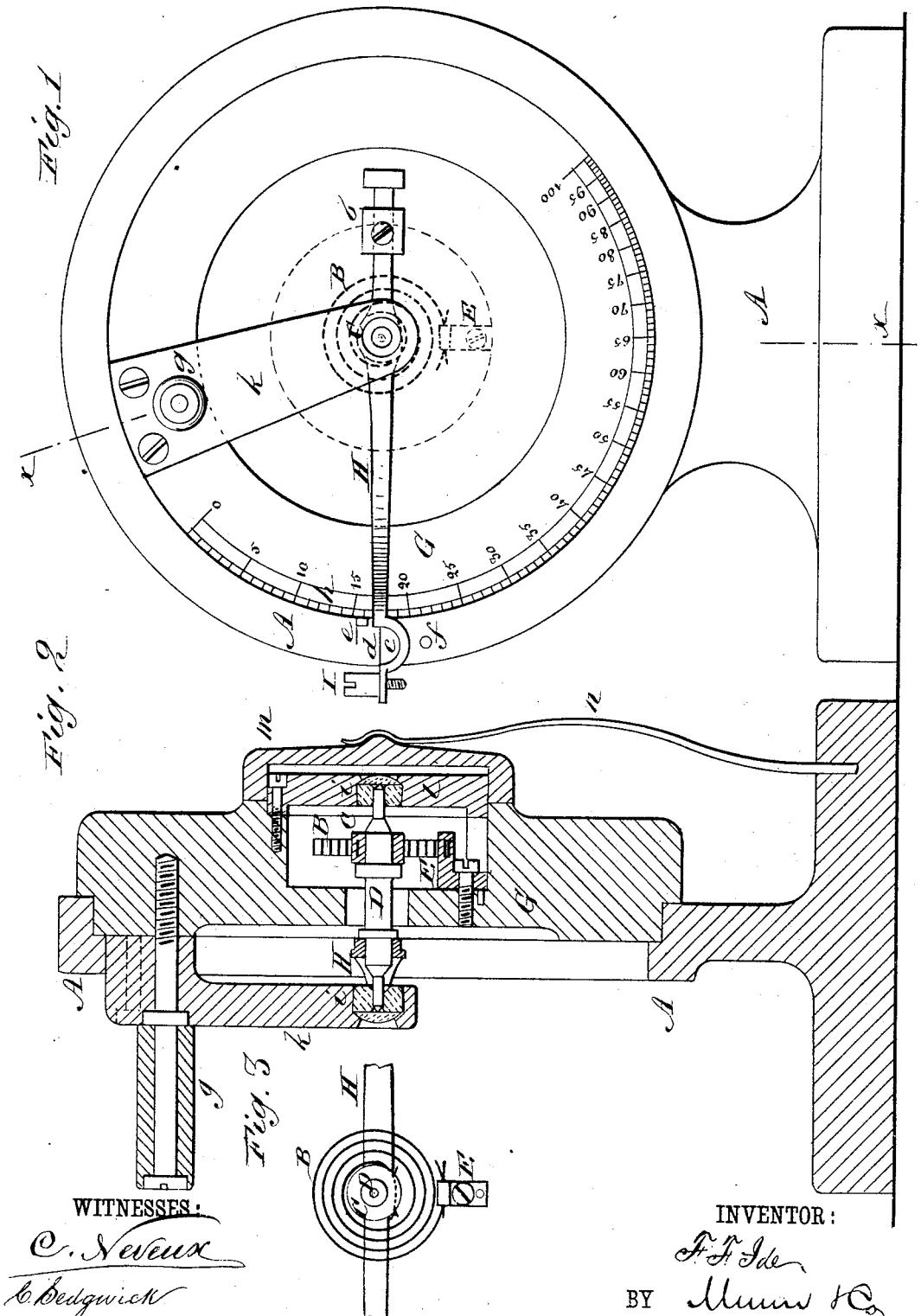

United States Patent Office.

FERDINAND F. IDE, OF SPRINGFIELD, ILLINOIS.

SCALE FOR WEIGHING DIAMONDS, BALANCE-SCREWS OF WATCHES, &c.

SPECIFICATION forming part of Letters Patent No. 272,699, dated February 20, 1883.

Application filed November 27, 1882. (No model.)

*To all whom it may concern:*

Be it known that I, FERDINAND F. IDE, of Springfield, in the county of Sangamon and State of Illinois, have invented a new and useful Improvement in Scales for Weighing Diamonds, Balance-Screws of Watches, and other Small Articles, of which the following is a full, clear, and exact description.

The object of this invention is to construct a scale for weighing diamonds, balance-screws used in the balance-wheels of watches, and other small articles, which, by the few number of parts employed and their arrangement, reducing friction to its minimum, or nearly so, shall combine simplicity with great delicacy and accuracy, and shall admit of being worked or used with rapidity. These ends are most successfully attained by my invention, which comprises a rotating graduated disk, dial, or section thereof, with attached spring and weighing-lever, substantially as hereinafter described; also certain means of attaching the spring to the disk, including a friction-held ring and a compensating-stud, whereby said parts may be conveniently set or adjusted, as required.

Reference is to be had to the accompanying drawings, forming part of this specification, in which similar letters of reference indicate corresponding parts in all the figures.

Figure 1 represents a front view of a scale or weighing apparatus embodying my invention, and Fig. 2 a section of the same on the line $x\,x$ in Fig. 1. Fig. 3 is a rear view of the spring, with its attached friction-held ring, axle of the disk, compensating-stud, and weighing-lever.

A in the accompanying drawings indicates the frame of the apparatus, of annular construction, and mounted upon or having attached to it a suitable base or stand.

B is a coiled spring, attached at its inner end to a friction-held ring, C, fitted on or over an axle, D, in concentric position relatively to said annular frame, while the outer end of the spring is secured, by wedge or otherwise, to a compensating-stud, E, which is attached by screw or otherwise to a graduated disk, G, arranged to rotate within and concentric with the annular frame.

Upon the axle D is secured a weighing-lever, H, made to extend upon both sides of the center of the axle, and upon the one arm of which is fitted an adjusting-weight, $b$, while its other arm extends across the front of the frame A, and is bent, as at $c$, to receive across the hollow so formed an attached hair or fine divider, $d$, that is to be brought opposite or over a corresponding line upon the face of the annular portion of the frame, when the lever is in weighing position, such line, which is between two stops, $e$ and $f$, being covered by the hair divider $d$ in Fig. 1 of the drawings. These stops $e$ and $f$ serve to limit the motion of the lever.

I indicates a balance-screw of the balance-wheel of a watch as in the act of being weighed, and which is placed upon or fitted within a perforation in the outer indicating end of the lever H.

The lever H should be made of aluminum or otherwise, of as light construction as possible, and the weight $b$ upon its shorter arm is adjusted upon it so as to balance the longer arm of the lever. The attachment of the spring B at its inner end to the axle by or through the intervention of the friction-held collar or ring C, and at its outer end to the disk G by the insertion of said end, in an adjustable manner, within or through the stud E, that thus forms a compensating device, provides for the most accurate adjustment of the lever to bring its hair divider $d$ opposite or over the indicating or leveling line above referred to on the annular frame A.

The operation of the apparatus is as follows: The screw I, or other article to be weighed, is placed upon the lever H, which will have a tendency to coil or compress the spring B from its inner end. The disk G is then rotated, by means of a handle, $g$, or otherwise, to further coil or compress the spring from its outer end until its strength or tension is equal to the weight of the article to be weighed upon the lever, which will be ascertainable by the lever coming to a state of rest in the same position as it occupied before the article to be weighed was placed upon it—that is, for instance, with its hair divider $d$ over the indicating or leveling line on the frame. The distance thus moved by the disk, as indicated by the graduations $h$ on it, will show the weight of the balance-screw or other article upon the lever.

The axle D may have its bearings $i\,i$, the one in a guard, k, secured to the front side of the disk, and the other in a plate, l, fast to the back of the disk, which has a pressure-cap, m, in the rear of it, acted upon by a spring, n, to keep the disk up to its place in the annular frame.

Having thus described my invention, what I claim as new, and desire to secure by Letters Patent, is—

1. In a scale or weighing apparatus, the combination of the rotating disk G, the spring B, and the lever H, arranged for operation substantially as and for the purposes herein set forth.

2. The combination of the friction-held ring C and compensating-stud E with the spring B, the axle D, the lever H, and the rotating graduated disk G, essentially as shown and described.

FERDINAND F. IDE.

Witnesses:
ADOLPH F. DEICKEN,
HERMAN PIERCK.